May 30, 1961
H. W. KNIGHT
2,986,344
HYDRAULIC MONITOR
Filed July 23, 1959
3 Sheets-Sheet 3
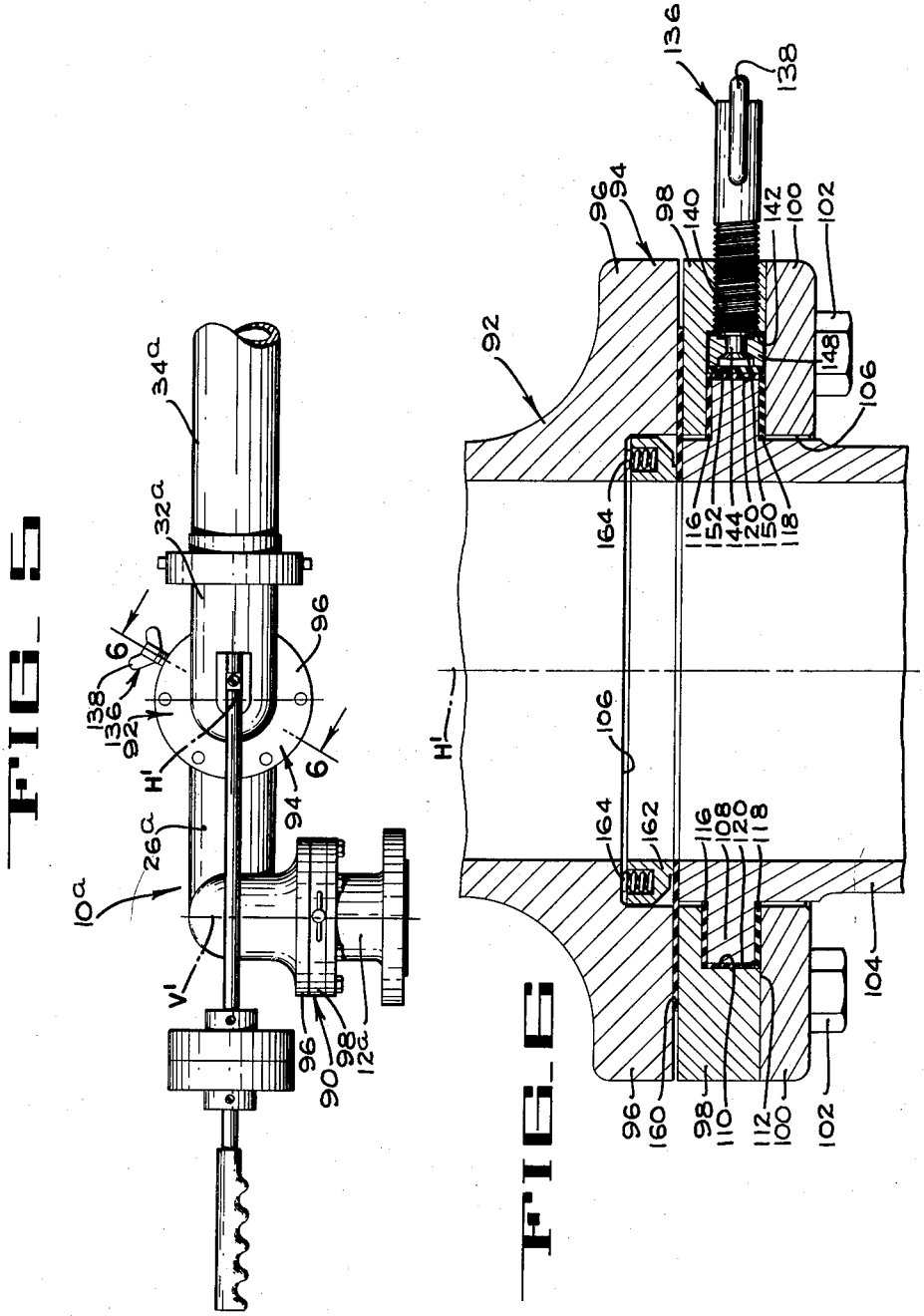
INVENTOR
HOUSTON W. KNIGHT
BY *Hans F. Hoffmeister*
ATTORNEY United States Patent Office 2,986,344
Patented May 30, 1961

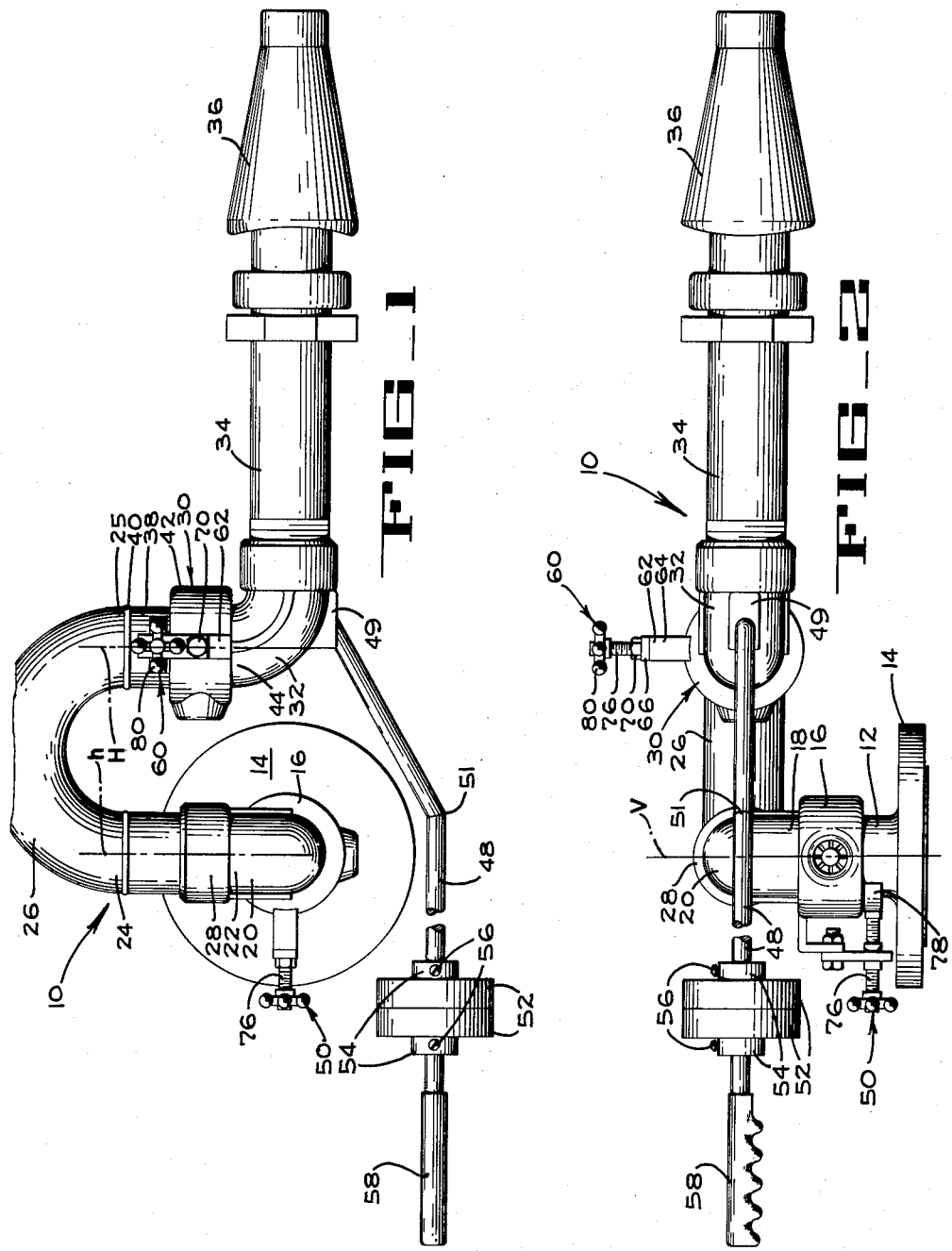

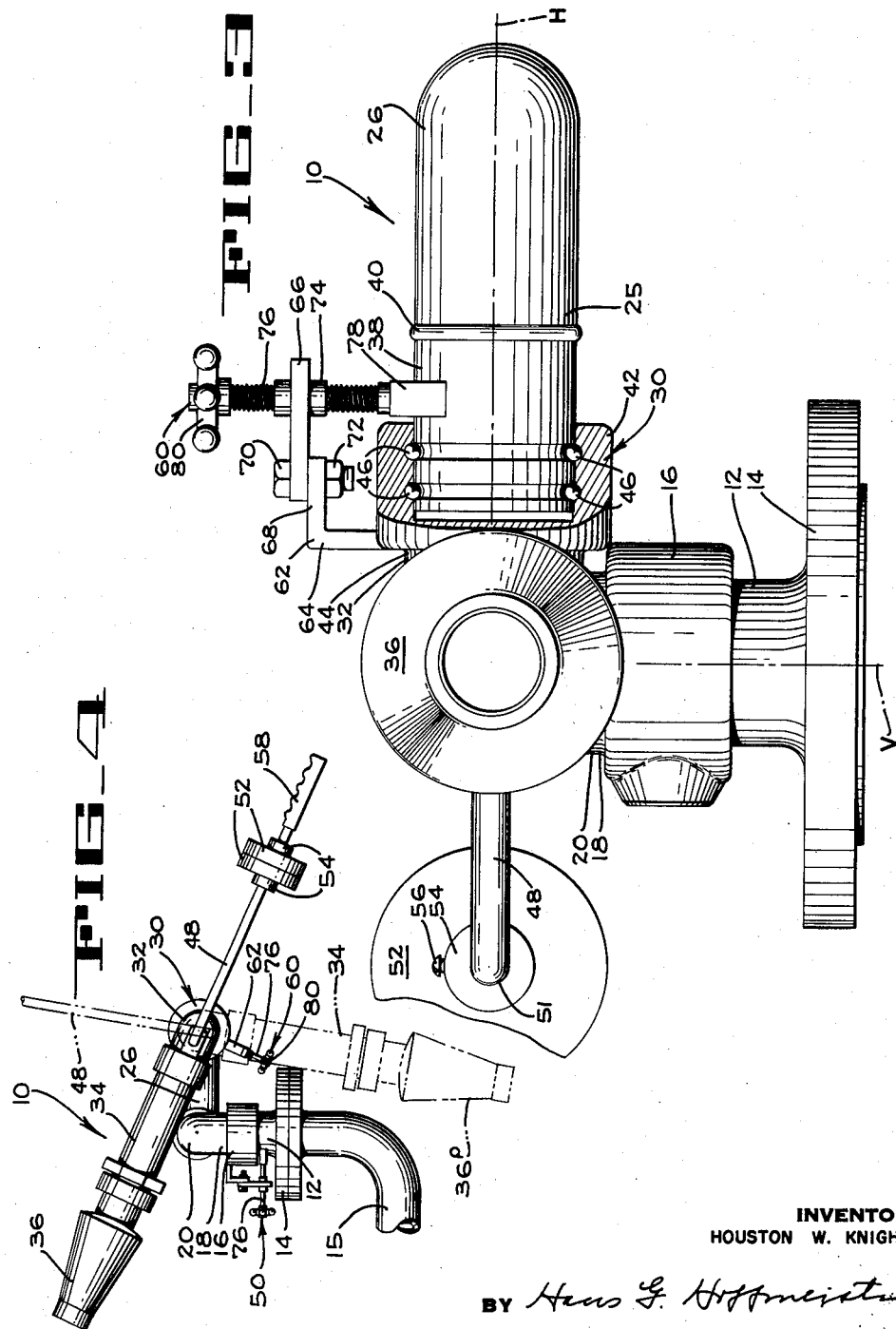

2,986,344
HYDRAULIC MONITOR

Houston Wheeler Knight, La Mirada, Calif., assignor to Chiksan Company, Brea, Calif., a corporation of California Filed July 23, 1959, Ser. No. 829,030
11 Claims. (Cl. 239—587)

The present invention relates generally to hydraulic monitors of the type used in such operations as fire fighting, placer mining, earth packing and earth removal, and more particularly to a monitor which is manually operable to control the direction in which it jets a stream of liquid.

The control of the direction of a stream of water or other liquid discharged from a monitor is of great importance in for example, fire fighting, placer mining, and the packing of earth filled dams. Where directional control of the stream is demanded, the basic requirements of a monitor include ease of adjustment for changing the direction of the stream of liquid in both a horizontal and a vertical plane and in planes lying therebetween, and the ability of the monitor to remain stationary in a selected position to discharge its jet in a predetermined direction while unattended.

An object of the present invention is to provide an improved manually operable monitor.

Another object of this invention is to provide a monitor in which the thrust forces produced by the discharge of liquid through the nozzle will exert no turning moment upon the pivotable parts of the monitor.

Another object is to provide a manually operable monitor in which tendency of the monitor to rotate in response to backthrust resulting from the discharge of liquid from the nozzle is avoided by causing the line of action of the nozzle reaction to intersect both axes about which the nozzle of the monitor is rotatable.

Another object is to provide a monitor whose nozzle is readily movable by manual operation to direct the stream of liquid jetted from the nozzle in a selected direction.

Another object is to provide a monitor which is readily adjustable to establish and maintain static balance of the monitor with nozzles of different sizes and weights.

Another object is to provide a monitor which, when unattended, will remain stationary in a desired position.

Another object is to reduce the tendency of the monitor to tip over when the nozzle is pointed obliquely upward.

Another object is to provide a monitor which is compact in construction so as to dispose its center of gravity close to its mounting on a supporting element to gain stability when the nozzle is tilted upward above the horizontal.

Another object is to provide a monitor which is simple in construction, durable in constant use over extended periods, reliable in operation, economical in cost and efficient in performance.

These and other objects and advantages of the present invention will become apparent from the following detailed description and the drawings, in which:

Fig. 1 is a partly broken away plan of the monitor of the present invention.

Fig. 2 is a partly broken away side elevation of the monitor of Fig. 1.

Fig. 3 is a front elevation thereof, on a somewhat enlarged scale, partly broken away to show internal construction.

Fig. 4 is an operational view similar to Fig. 2, drawn to a reduced scale and indicating the range through which the nozzle of the monitor can be pivoted in a vertical plane.

Fig. 5 is a side elevation similar to Fig. 2, showing a modified form of swivel joint and brake arrangement.

Fig. 6 is an enlarged cross section taken along lines 6—6 of Fig. 5.

The monitor 10 of the present invention comprises a straight tubular conduit section or riser 12 (Figs. 2 and 3) having a flange 14 at one end adapted for mounting on a support element, such as a penstock 15 (Fig. 4). Whereas the monitor 10 is illustrated with the axis of its riser 12 disposed vertically, it should be understood that it is likewise feasible to mount the riser or conduit section 12 with its axis horizontal or otherwise for specific applications of the monitor. A ball bearing swivel joint 16 carried by the upper open end of the riser 12 mount one end 18 of a 90° elbow 20 on the upper end of the riser 12 for rotation in a horizontal plane about a vertical axis V (Figs. 2 and 3) coincident with the axis of the riser. The other end 22 (Fig. 1) of the 90° elbow is horizontal and therefore is perpendicular to the vertical axis V of the riser 12.

To form a continuous passage in the monitor 10 for liquid introduced under pressure into the riser 12 and flowing through the elbow 20 one end 24 of a 180° elbow 26 is fixedly secured to the end 22 of the elbow 20 in any suitable manner, as by a collar 28. Therefore, the 180° elbow 26 is carried by the 90° elbow 20 for 360° rotation in a plane which is perpendicular to the axis V. This permits horizontal adjustment of the monitor 10 to change the direction of its jet about the vertical axis V.

The axes h and H (Fig. 1) of the receiving end 24 and of the discharge end 25, respectively, of the 180° elbow 26 are parallel to each other, and the entire elbow 26 is symmetrical about the horizontal plane that includes both axes h and H. The axis h of the receiving end 24 intersects the vertical axis V, and the axis H of the discharge end 25 is offset a substantial distance forward therefrom, as clearly shown in Fig. 1.

To allow the direction of liquid discharged from the monitor 10 to be changed vertically about the horizontal axis H, a ball bearing swivel joint 30 (Figs. 1-4) is provided on the discharge end 25 of the 180° elbow 26. A 90° elbow 32 and a short straight pipe section 34 (Figs. 1 and 2) are rotatably mounted on the discharge end 25 of the 180° elbow by the swivel joint 30 for rotation about the axis H and a nozzle 36 is fixedly secured to the outer end of the pipe section 34. The passage formed by the 180° elbow 26, swivel joint 30, 90° elbow 32, pipe section 34, and nozzle 36 completes the continuous liquid passage through the monitor 10.

The swivel joints 16 and 30 are identical and, therefore, the following detailed description of the swivel joint 30 is applicable likewise to the construction of the swivel joint 16 except for the elements of the monitor rotatably interconnected thereby. As shown in Fig. 3, the swivel joint 30 has a male section 38 secured as by welding 40 to the discharge end 25 of the 180° elbow 26. A female section 42 rigid with the receiving end 44 of the 90° elbow 32 is mounted upon the male section 38 for rotation about the horizontal axis H by ball bearings 46. The 90° elbow 20 is similarly mounted on ball bearings (not shown) within the swivel joint 16 for free rotation about the vertical axis V.

In order to effectively manipulate the monitor 10 so that the direction of the jet discharged from the nozzle 36 can be selected by swiveling the nozzle about either or both of the angularly related axes V and H by manual operation, a handle 48 (Figs. 1–4) is secured, as by welding, at one end to a block-like boss 49 formed on the exterior of the 90° elbow 32. The handle 48 is angularly offset intermediate its ends, as at 51, so that the inner part of the handle 48 is inclined outwardly as it recedes from its point of connection to boss 49. This offset of the handle permits manual swinging of the nozzle 36 about the horizontal axis H without interference by the flange 14 or a brake assembly 50 (Figs. 1–3) carried by the swivel joint 16.

The conduit section or riser 12 is adapted for attachment to a source of water or other liquid under pressure. Liquid under pressure entering the monitor 10 through the riser 12 will flow through the continuous passage in the monitor as defined by the 90° elbow 20, the 180° elbow 26, the 90° elbow 32, the pipe 34 and the nozzle 36. Hence, the liquid will be ejected from the discharge end of the nozzle 36, which is shown as being of the foam type, although other types, sizes and weights of nozzles can be readily interchanged therewith.

As is clearly apparent from Figs. 1, 2 and 3, the parts of the monitor 10 are so arranged that in all possible positions of the nozzle 36, the line of action of the nozzle reaction resulting from jetting a stream of liquid from the nozzle 36 intersects both the vertical axis V and the horizontal axis H. Since these are the only axes about which the nozzle 36 is free to pivot, the nozzle reaction does not impose any turning moment upon any of the movable parts of the monitor, which, therefore, do not develop any tendency to move as a consequence of jetting a stream from the nozzle 36 at high velocity or otherwise.

The nozzle 36 is removably attached to the pipe 34, and consequently can quickly and easily be replaced by another, as, for example, when a jet stream of different characteristics is desired. When the replacement nozzle is of a different weight, a static balance in the monitor is readily achieved and maintained by adjustment of counterweights 52 slidably mounted for movement longitudinally of the straight outer section of the handle 48 to counterbalance and neutralize the change in balance caused by the change of nozzles. Collars 54 on opposite sides of the counterweights 52 carry set screws 56 whereby the counterweights can be fixed on the handle at selected position of adjustment therealong.

In operation, the handgrip 58 on the terminal end of the handle 48 is manually gripped. The nozzle 36 can then be swiveled about either or both of the monitor's mutually perpendicular axes of rotation V and H, thus swinging the nozzle in a horizontal plane, in a vertical plane, or in any plane between the vertical and horizontal, to direct the stream of liquid discharged from the nozzle 36 in a selected direction.

Theoretically, because of the static balance achieved by the adjustment of the counterweights 52, the monitor will stay in any desired position of rotational adjustment. However, due to inaccuracies of manufacture of the type apt to occur in any manufactured article and which, when present, might upset the monitor's static balance, and/or due to external forces such as wind, vibration and pump pulsation which tend to unbalance the monitor during operation, the monitor 10 might occasionally be placed in a condition of imbalance. Therefore, means are provided for releasably locking the relatively movable parts of the monitor 10 with the nozzle 36 pointing in any selected direction. This locking means includes the hereinbefore mentioned brake assembly 50 associated with the vertical swivel joint 16 and a similar brake assembly 60 associated with the horizontal swivel joint 30. Since the two brake assemblies 50 and 60 are of similar construction and are similarly mounted on the respective swivel joints, the following description of the assembly 60 will suffice for both.

The brake assembly 60 comprises a two-piece bracket 62 including an L-shaped member 64 with one leg welded to the female section 42 of the associated swivel joint 30 and projecting radially outward therefrom. A flat extension bar 66 is mounted on the other leg 68 of the L-shaped member 64 by means of a bolt 70 extending through registering openings (not shown) in the bar 66 adjacent one end thereof and in the leg 68, and a nut 72 threaded onto the bolt 70. An internally threaded sleeve 74 is carried by the other end of the bar 66 and extends transversely therethrough. A brake stud 76 threaded through the sleeve 74 carries at one end an arcuate brake shoe 78 curved to mate with the curvature of the male section 38 of the swivel joint 30. By rotating the hand wheel 80 fixed to the other end of the stud 76 the stud will be advanced through the sleeve 74 and cause the brake shoe 78 to frictionally engage the outer surface of the male section 38, thus immobilizing the same relatively to the female section 42.

With the brake shoes 78 of both brake assemblies 50 and 60 thus tightened, the monitor 10 will be secured against movement of its nozzle 36 and thus can safely be left unattended when it is desired that the stream therefrom be jetted in a certain direction for any length of time.

To again assume manual control of the monitor 10 the brake stud 76 of either or each brake assembly 50, 60 is backed off to release the brake shoe 78 thereof from its frictional engagement with the associated male swivel joint section.

Due to the mounting of the horizontal swivel joint 30 on the outer leg of the 180° elbow 26 rather than on the inner leg thereof in accord with the design of hydraulic monitors at present in common use, the horizontal axis H of pivotal movement of the nozzle is spaced forward from the vertical axis V, as hereinabove stated. As a consequence, the monitor 10 of the present invention is characterized by a greatly increased range of vertical swing of its nozzle 36 as compared with previously known monitors. The nozzle 36 can be pivoted upward to the vertical and approximately sixty-five or seventy degrees therepast as shown in full lines in Fig. 4. Pivoting in the opposite direction, the nozzle 36 can be swung downward to the vertical and approximately ten or fifteen degrees therepast, as indicated by the phantom showing 36p in Fig. 4. Thus, the range of vertical swing of the nozzle 36 is of the order of from two hundred fifty to two hundred sixty-five degrees, which, of course, increases the range of utility of the monitor 10 beyond that of previously known monitors whose nozzles can be swung through vertical arcs of considerably less angular extent.

This increased range of vertical swing is attained in the monitor 10 of the present invention by reason of the fact that the 180° elbow 26 does not participate therein, but remains in its horizontal disposition as the nozzle 36 turns about the horizontal axis H. Thus, movement of the nozzle 36 is not arrested by engagement of the 180° elbow 26 with other parts of the monitor 10, as is the case with monitors of commonly known design.

Another advantage derived from designing the monitor so that its horizontal axis H is offset forwardly from the vertical axis V is that it reduces the tendency for the monitor to tip over when the nozzle 36 directs its jet in an upwardly inclined direction. By locating the horizontal swivel joint 30 forward of the vertical swivel joint 16, the force of the nozzle reaction is within the confines of the base or conduit section 12 at a smaller upward inclination of the nozzle 36 than would be the case if the axis H of the swivel joint 30 intersected the axis V of the swivel joint 16. Thus, the tendency of the monitor 10 to tip when the jet from the nozzle 36 is directed obliquely upward is substantially reduced. Therefore, the monitor 10 enjoys special advantages adapting it for use as a portable unit in fire fighting operations since the nozzle reaction will actually assist in holding the monitor down and holding it stationary.

In the modified form of monitor 10a that is illustrated in Figs. 5 and 6 parts that are the same as corresponding parts of the first described form 10 will be identified by the same respective reference numerals with the suffix "a" added.

The monitor 10a is essentially the same as the monitor 10 of Figs. 1-4, except for the particular type of swivel joints and brake assemblies employed therewith, which especially adapts the monitor 10a for use with corrosion causing liquids such as salt water. The monitor 10a has a pair of identical combined swivel joint and brake assemblies 90 and 92 which replace the swivel joints 16 and 30 respectively, and the respectively associated brake assemblies 50 and 60 of the monitor 10. The assembly 90 rotatably mounts the 180° elbow 26a on the upper end of the conduit section or riser 12a for rotation about a vertical axis V' coincident with the axis of the riser 12a. The assembly 92 along with the short 90° elbow 32a and straight pipe section 34a mount the nozzle (not shown) on the outer end of the 180° elbow 26a, for rotation in a vertical plane about a horizontal axis H' spaced forward from the axis V' and lying within the general horizontal plane of the 180° elbow 26a.

Since the swivel joint and brake assemblies 90 and 92 are identical, only the assembly 92 will be described in detail. As shown in Figs. 5 and 6, the female section 94 of the swivel joint sportion of the asembly 92 comprises a flange 96 formed on the inlet end of the 90° elbow 32a, an annular body 98, and an annular plate 100 releasably secured together by bolts 102. The male section 104 is welded to the outer end, i.e., the discharge end, of the 180° elbow 26a in the same manner that the male section 38 of the swivel joint 30 is secured to the 180° elbow 26 of the first described form of the invention. The flange 96, the annular body 98 and the annular plate 100 are all of the same outside diameter, and when they are bolted together in assembled relation, they cooperate with each other to define a cylindrical socket 106 within which the male section 104 is rotatably retained by an annular flange 108 projecting radially outward from the male section 104 into an annular recess 110 formed in the inner circumference and in one lateral face 112 of the annular body 98. The side of the annular recess that opens at the face 112 of the body 98 is closed by the annular plate 100 when the assembly 92 is assembled, so that the annular plate 100 normally retains the swivel joint in assembled relation, but can be removed to permit the male section 104 to be removed from or inserted into the female section 94.

Friction-reducing bearing members 116, 118, and 120 are provided between the male and female sections 104 and 94, respectively, to facilitate rotary movement therebetween. The bearing members 116 and 118 are formed as flat rings preferably made of a material having a low coefficient of friction, a high compressive value and a high resistance to corrosion, such as "nylon," "Teflon," "Kel–F," or "Mylar." The member 116 is disposed between one side face of the flange 108 and the adjacent side of the recess 110 while the bearing ring 118 is arranged between the other side face of the flange 108 and the adjacent face of the annular plate 100. Bearing member 120 is a lining made of a strip of material of the same type as that from which bearing rings 116 and 118 are fashioned and whose length is nearly equal to the larger circumference, or bottom, of the recess 110 against which it is fitted. The bearing strip 120 extends between the outer circumferences of the bearing rings 116 and 118, as shown in Fig. 6 so that the bearing members 116, 118 and 120, in effect, form an annular bearing of U-shaped cross section within which the flange 108 is journalled.

The bearing ring 118 resists thrust resulting from the hydrostatic pressure within the monitor 10a tending to force the assembly 92 apart, the bearing ring 116 resists the load imposed on the joint if a force greater than the thrust resulting from internal pressure should be exerted on the joint in the opposite direction, and the bearing lining 120 resists radial load. This swivel joint, due to the material from which the bearing members are made, effectively resists the corrosive action of liquids such as salt water and does not require lubrication for efficient continued operation.

The brake portion 136 of the assembly 92 comprises a wing-headed brake stud 138 threadedly engaged within a bore 140 extending radially through the annular body 98 and opening into a pocket 142 formed in the bottom of the annular recess 110. The inner end 144 of the stud 138 is of reduced diameter and extends through a hole formed in a brake shoe 148 disposed in the pocket 142. The stud end 144 is peened over, as at 150, to secure the shoe to the stud. Thus, the shoe is swivelled upon the stud end 144. The shoe 148 is provided along its outer face with a lining 152 disposed in face-to-face relation with the bearing lining 120. The brake portion 136 of the assembly 92 is made effective by turning the stud 138 in the direction that advances it through the bore 140 and causes the shoe 148 and the brake lining 152 thereon to press against the bearing lining 120 to hold the swivel joint in a fixed position of rotation about the horizontal pivot axis H'. To revert to manual operation, the stud 138 is backed off to disengage the brake portion of the assembly.

The combined swivel joint and brake assembly 90 is identical with the assembly 92 and in the operative position of its brake portion, the assembly 90 will hold the nozzle in a selected position of rotation about the vertical axis V'.

In order to prevent leakage between the parts of the monitor 10a that are rotatably interconnected by the assemblies 90 and 92, each assembly 90, 92 is provided with an annular sealing gasket 160 (Fig. 6). The outer peripheral region of the gasket 160 is clamped between the flange 96 and the annular member 98 of the respective assembly 90, 92 and thus is held stationary with respect to the female swivel joint section 94 thereof. The inner peripheral region of the gasket 160 projects radially inward into the socket 106 of the female joint section 94 wherein it lies flat against the annular end face of the male joint section 104, which rotates relatively to the gasket 160 when relative motion occurs between the two swivel joint sections 94 and 104. A pressure ring 162 is disposed in the socket 106 and a plurality of springs 164 under compression between the ring 162 and the bottom end surface of the socket 106 press the ring against the gasket 160 so as to maintain an efficient sliding fluid-sealing engagement between the gasket 160 and the end of the male joint section 104 and thus to prevent leakage between the relatively movable parts of the swivel joint portion of the respective assembly 90, 92.

While specific embodiments of the present invention have been shown and described, it will be understood that various changes and modifications may be made therein without departing from the spirit of the invention or the scope of the appended claims.

Having thus described the present invention and the manner in which the same is to be used, what is claimed as new and desired to be protected by Letters Patent is:

1. A monitor comprising a liquid discharge nozzle, a vertical conduit section adapted for connection to a source of liquid under pressure, a 90° elbow mounted at one end on said conduit section for rotation in a horizontal plane about the vertical axis of said conduit section and having the axis of its other end lying in said horizontal plane, a 180° elbow mounted at one end on said other end of said 90° elbow for movement therewith and disposed symmetrically about said horizontal plane, and means for mounting the intake end of said nozzle on the other end of said 180° elbow for rotation about a horizontal axis lying within said horizontal plane and spaced from said vertical axis.

2. A monitor comprising a liquid discharge nozzle, a conduit section adapted for connection to a source of liquid under pressure, a 90° elbow, means mounting one end of said 90° elbow on said conduit section for rotation in a plane perpendicular to the axis thereof and having the axis of its other end lying in said plane, a 180° elbow mounted at one end on said other end of said 90° elbow for movement therewith and disposed symmetrically about said plane with the axis of its other end lying within said plane, and means for mounting the intake end of said nozzle on the other end of said 180° elbow for rotation in a plane perpendicular to said axis of said other end of the 180° elbow and spaced from said axis of the conduit section, whereby the nozzle is movable about two angularly related axes.

3. A monitor comprising a liquid discharge nozzle, a conduit section adapted for connection to a source of liquid under pressure, a 90° elbow mounted at one end on said conduit section for rotation about the axis of said section and having the axis of its other end lying in a plane perpendicular to said axis, a 180° elbow secured at one end to the other end of said 90° elbow and arranged with the axis of the other end of the 180° elbow lying within said perpendicular plane, said nozzle having its intake end carried by the other end of said 180° elbow for rotation in a plane perpendicular to said axis of said other end of the 180° elbow and about said axis of said other end of the 180° elbow, whereby said nozzle is movable about two mutually perpendicular axes.

4. A manually operable monitor comprising a discharge nozzle, a conduit section adapted for connection to a source of liquid under pressure, a 90° elbow, means mounting one end of said 90° elbow on said conduit section for rotation in a plane perpendicular to the axis of said section and having the axis of its other end lying in said plane, a 180° elbow mounted at one end on said other end of said 90° elbow for movement therewith and disposed symmetrically about said plane with the axis of its other end lying within said plane, means for mounting the intake end of said nozzle on the other end of said 180° elbow for rotation in a plane perpendicular to said first mentioned plane and spaced from said axis of the conduit section whereby the monitor is movable about two angularly related axes, and an elongate handle rigid with said nozzle for manually moving said nozzle about the angularly related axes of rotation.

5. The monitor as set forth in claim 4 in which said nozzle is removably mounted on said other end of the 180° elbow to adapt the monitor for use with any of a variety of nozzles, and which includes weights carried on said handle for movement longitudinally therealong to selected positions for counterbalancing the weight of the selected nozzle and of said nozzle mounting means.

6. The monitor as set forth in claim 4 which includes brake arrangements operatively connected to said 90° elbow mounting means and with said nozzle mounting means to hold said 90° elbow and said nozzle, respectively, against rotational displacement in selected positions of rotation about the angularly related axes.

7. A manually operable monitor comprising a discharge nozzle, a tubular conduit section adapted for connection to a source of liquid under pressure, a first swivel joint mounted on said conduit section, a 90° elbow having one end mounted on said first swivel joint for rotation about the axis of said end of the elbow and in a plane perpendicular to said axis, the axis of the other end of said 90° elbow lying in said plane, a 180° elbow having one end fixedly secured to said other end of said 90° elbow for rotation therewith, the axes of the two ends of said 180° elbow being parallel and lying within said plane, a second swivel joint mounted on said other end of the 180° elbow in coaxial relation therewith, said nozzle having its intake end operatively connected to said second swivel joint for rotation about the axis thereof, the axis of said nozzle lying in a plane including the axis of said first swivel joint, said first and second swivel joints providing angularly related axes about which the nozzle can be moved, and an elongate handle carried by said second swivel joint for manually moving the monitor about the angularly related axes.

8. The manually operated monitor as set forth in claim 7 and wherein there is provided a weight carried by said handle for movement longitudinally thereof to a selected position wherein the weight of said nozzle is counterbalanced by said weight, and means for securing said weight in the selected position.

9. The manually operated monitor as set forth in claim 7 and wherein a brake assembly is associated with each of said swivel joints for frictionally engaging, respectively, the 90° elbow and the nozzle connecting means to secure the monitor in a selected position of rotation about said angularly related axes.

10. The monitor as set forth in claim 9 wherein each of said brake assemblies comprises an L-shaped bracket secured at one end to one of the relatively rotatable sections of the associated swivel joint, an extension plate pivotally carried by the distal end of said bracket, an internally threaded sleeve carried by said plate, a stud threadedly engaged in said sleeve for movement therethrough, and an arcuate brake shoe swivelled on said stud and curved to mate with the external curvature of the other of the relatively rotatable sections of the associated swivel, said plate being movable about its pivot to seat said brake shoe conformably upon said other swivel section of the associated swivel joint.

11. A monitor comprising a liquid discharge nozzle, a conduit section adapted for connection to a source of liquid under pressure, a 90° elbow, a first combined swivel joint and brake assembly mounting one end of said 90° elbow on said conduit section for rotation in a plane perpendicular to the axes of said section and having the axis of its other end lying in said plane of rotation, a 180° elbow fixedly connected at one end to said other end of the 90° elbow to mount the 180° elbow, a second combined swivel joint and brake assembly arranged coaxially upon the other end of said 180° elbow, the axes of both ends of the 180° elbow lying within said plane, and means connecting said nozzle to said second assembly for rotation about the axis of said second swivel joint and with the axis of the nozzle lying in a plane perpendicular to the axis of said second swivel joint, whereby said nozzle is movable about two angularly related axes and can be releasably locked in a selected position of rotation about either or both of said angularly related axes.

References Cited in the file of this patent

UNITED STATES PATENTS

| | | |
|---|---|---|
| 2,111,553 | Chew | Mar. 22, 1938 |
| 2,398,962 | Randrup | Apr. 23, 1946 |
| 2,571,641 | Wing | Oct. 16, 1951 |
| 2,612,402 | Miscovich | Sept. 30, 1952 |